(12) United States Patent
Fink (10) Patent No.: US 7,125,308 B2
(45) Date of Patent: Oct. 24, 2006

(54) BEAD BLAST ACTIVATION OF CARBON NANOTUBE CATHODE

(75) Inventor: Richard Lee Fink, Austin, TX (US)

(73) Assignee: Nano-Proprietary, Inc., Austin, TX (US)

( * ) Notice: Subject to any disclaimer, the term of this patent is extended or adjusted under 35 U.S.C. 154(b) by 0 days.

(21) Appl. No.: 10/877,241

(22) Filed: Jun. 25, 2004

(65) Prior Publication Data

US 2005/0136788 A1  Jun. 23, 2005

Related U.S. Application Data

(60) Provisional application No. 60/530,584, filed on Dec. 18, 2003.

(51) Int. Cl.
H01J 9/04 (2006.01)

(52) U.S. Cl. .......................... 445/51; 445/50

(58) Field of Classification Search ............ 445/50–51, 445/24–25; 205/208; 427/348; 264/12
See application file for complete search history.

(56) References Cited

U.S. PATENT DOCUMENTS

| | | | | |
|---|---|---|---|---|
| 5,236,382 | A * | 8/1993 | Oh ............................... | 445/50 |
| 5,417,600 | A * | 5/1995 | Maegawa et al. ............. | 445/51 |
| 5,876,542 | A | 3/1999 | Fujiwara ...................... | 156/107 |
| 6,048,243 | A * | 4/2000 | Kosaka et al. ................ | 445/24 |
| 6,239,547 | B1 * | 5/2001 | Uemura et al. .............. | 313/495 |
| 6,270,571 | B1 * | 8/2001 | Iwasaki et al. ............... | 117/88 |
| 6,296,740 | B1 * | 10/2001 | Xie et al. ................... | 204/192.11 |
| 6,409,567 | B1 * | 6/2002 | Amey et al. .................. | 445/50 |
| RE38,223 | E | 8/2003 | Keesmann et al. ......... | 313/309 |
| 6,645,402 | B1 * | 11/2003 | Kurokawa et al. .......... | 252/502 |
| 6,713,947 | B1 * | 3/2004 | Hirasawa et al. ........... | 313/313 |
| 6,813,828 | B1 * | 11/2004 | Dlugokecki et al. .......... | 29/827 |
| 6,866,562 | B1 * | 3/2005 | Girolamo ...................... | 451/38 |
| 2002/0104603 | A1 | 8/2002 | Chang et al. ............ | 156/89.12 |
| 2002/0109086 | A1 | 8/2002 | Colbert et al. .............. | 250/306 |
| 2003/0092207 | A1 * | 5/2003 | Yaniv et al. .................. | 438/20 |
| 2004/0109813 | A1 | 6/2004 | Hwang et al. ........... | 423/447.1 |

OTHER PUBLICATIONS

S. Nakata et al., "Fabrication of CNT Electron Source by Simple Stacking for Obtaining Uniform Emission Distributions," *SID 04 Digest*, Society for Information Display 2004 International Symposium, Digest of Technical Papers, vol. XXXV, Book II, May 26-27, 2004, pp. 928-931.

Junto Yotani et al., "CNT-FED for Character Displays," *SID 04 Digest*, Society for Information Display 2004 International Symposium, Digest of Technical Papers, vol. XXXV, Book II, May 26-27, 2004, pp. 828-831.

(Continued)

*Primary Examiner*—Joseph Williams
*Assistant Examiner*—Dalei Dong
(74) *Attorney, Agent, or Firm*—Kelly K. Kordzik; Winstead Sechrest & Minick P.C.

(57) ABSTRACT

Activation of printed or dispensed carbon nanotube (CNT) film using a particle-blasting technique, also referred to as sandblasting or bead blasting. The process works by sending particles of material at high enough velocity such that when the particles hit the surface, some of the material at the surface is removed. The surface of the printed CNT film is slowly eroded away by the particles from the particle gun. The CNT fibers may be embedded in several layers of the printed layer, so they may not be removed easily.

3 Claims, 11 Drawing Sheets

OTHER PUBLICATIONS

Chih-Che Kuo et al., "Spray-Coating Process for Preparing CNT-FED Cathode," *SID 04 Digest*, Society for Information Display 2004 International Symposium, Digest of Technical Papers, vol. XXXV, Book II, May 26-27, 2004, pp. 825-827.

C. G. Lee et al., "FEDs with CNT on Large Area Applications," *IDW '02*, Proceedings of the Ninth International Display Workshops, Dec. 4-6, 2002, pp. 1021-1024.

G. Z. Yue et al., "Generation of Continuous and Pulsed Diagnositc Imaging X-Ray Radiation Using a Carbon-Nanotube-Based Field-Emission Cathode," *Applied Physics*, vol. 81, No. 2, Jul. 8, 2002, pp. 355-357.

Chris Bower et al., "A Micromachined Vacuum Triode Using a Carbon Nanotube Cold Cathode," *IEEE Transactions on Electron Devices*, vol. 49, No. 8, Aug. 2002, pp. 1478-1483.

W. Rochanachirapar et al., "Effect of Laser Irradiation on CNT-Cathodes in Different Atmospheres," *IDW '03*, Proceedings of the 10th International Display Workshops, Dec. 3-5, 2003, pp. 1207-1210.

Yasunori Kanazawa et al., "Improvement in Electron Emission from Carbon Nanotube Cathodes after Ar Plasma Treatment," *J. Vac. Sci. Technol. B*, 22(3), May/Jun. 2004, pp. 1342-1344.

Kwang-Bok Kim et al., "Efficient Electron Emissions from Printed Carbon Nanotubes by Surface Treatments," *J. Vac. Sci. Technol. B*, 22(3), May/Jun. 2004, pp. 1331-1334.

Jong Min Kim et al., "Field Emission from Carbon Nanotubes for Displays," *Diamond and Related Materials 9*, (2000), pp. 1184-1189.

T. J. Vink et al., "Enhanced Field Emission from Printed Carbon Nanotubes by Mechanical Surface Modification," *Applied Physics Letters*, vol. 83, No. 17, Oct. 27, 2003.

* cited by examiner

BEAD BLAST ACTIVATION OF CARBON NANOTUBE CATHODE

CROSS-REFERENCE TO RELATED APPLICATIONS

The present invention claims priority to U.S. Provisional Application Ser. No. 60/530,584 filed Dec. 18, 2003.

TECHNICAL FIELD

The present invention relates in general to field emission devices, and particularly to field emission from carbon nanotubes.

BACKGROUND INFORMATION

Carbon nanotubes (CNTs) are used as cold cathode electron sources for field emission applications. These applications include displays (see U.S. Pat. No. RE38,223; and C. G. Lee et al., "FEDs with CNT on large area applications," Proceedings of the 9$^{th}$ International Display Workshops, p. 1021, Dec. 4–6, 2002, Hiroshima, Japan), x-ray tubes (see U.S. Pat. No. RE38,223; and G. Z. Yue et al. "Generation of continuous and pulsed diagnostic imaging x-ray radiation using a carbon-nanotube-based field-emission cathode," Applied Physics Letters, Vol. 81, pp. 344–357), microwave devices (Chris Bower et al., "A micromachined vacuum triode using a carbon nanotube cold cathode," IEEE Transactions on Electron Devices, Vol. 49, No. 8, p. 1478, August 2002), satellite thrusters and neutralizers and other applications requiring a source of electrons. In some cases, the carbon nanotube film or layer is grown on the substrate using various chemical vapor deposition (CVD) techniques known in the state of the art. These films do not generally require an activation process and are used as grown. However, there are many advantages to fabricating the carbon nanotube (CNT) cathode by dispensing or printing the CNT layer. See U.S. Patent Publication No. US-2003-0092207-A1, incorporated by reference herein. These inks or pastes are deposited onto the substrate by screen printing, dispensing, ink-jet printing, spraying, painting or other such means.

These processes have several advantages over growing the CNT material onto the substrate using CVD techniques. The dispensing and printing processes do not require process temperatures much above 450° C.–500° C.; the CNT fabrication process (generally at 600° C. and above) is separated from the dispensing process. There are many vendors that supply many different sizes and characteristics of CNT, so optimal material for field emission applications can be identified. Furthermore, printing and dispensing processes are demonstrated to be low-cost and can be scaled to large area in high-volume manufacturing environments. These processes are also capable of making CNT films having superior field emission properties (low threshold fields, high current capability, etc.).

A problem with these printing or dispensing approaches is that they often require an activation process. These activation processes include laser blasting or laser beam activation (see Junko Yotani et al., "CNT-FED for Character Displays," Society for Information Display 2004 International Symposium Digest of Technical Papers, Vol. 35, Book II, p. 828–831, May 26–27, 2004; and also S. Nakata et al., "Fabrication of CNT Electron Source by Simple Stacking for Obtaining Uniform Emission Distributions," Society for Information Display 2004 International Symposium Digest of Technical Papers, Vol. 35, Book II, p. 928–931, May 26–27, 2004; and W. Rochanachirapar et al., "Effect of laser irradiation on CNT-cathodes in different atmospheres," Proceedings of the 10$^{th}$ International Display Workshops, p. 1207–1210, Dec. 3–5, 2003, Fukuoka, Japan), exposure to Ar ion plasma (see Yasunori Kanazawa et al., "Improvement in electron emission from carbon nanotube cathodes after Ar plasma treatment," Journal of Vacuum Science and Technology B, Vol. 22, p. 1342–1344, 3 Jun. 2004), air jet and surface scratching or rubbing (see Kwang-Bok Kim et al., "Efficient electron emissions from printed carbon nanotubes by surface treatments," Journal of Vacuum Science and Technology B, Vol. 22, p. 1331–1334, 3 Jun. 2004), or tape activation (see U.S. Publication No. US-2003-0092207-A1; and Yu-Yang Chang, Jhy-Rong Sheu, and Cheng-Chung Lee, "Method of improving field emission efficiency for fabricating carbon nanotube field emitters," U.S. Patent Application Publication 2002/0104603 A1; and Daniel T. Colbert et al., "Method for growing continuous carbon fiber and compositions thereof," U.S. Patent Application Publication 2002/0109086 A1).

Tape activation generally requires an adhesive tape and a roller or laminator. After the CNT paste is dispensed onto the substrate and processed at high temperature (e.g., 300° C.–500° C.) to eliminate organic binders and solvents and cure the paste, the tape is applied to the substrate such that the adhesive side of the tape is fixed to the top of the substrate and the CNT printed pattern. The tape is fixed by lamination or rolling or other means. The tape is then removed from the substrate, and during this process the top layer of the CNT paste is removed, exposing a fresh layer of CNT (not exposed to curing environment). The CNT density may also be altered and some of the CNTs may be aligned vertically to the substrate (parallel to the substrate normal). A problem with tape activation is that:

1) adhesive material may be left on the substrate,
2) it may be difficult to scale to large area and high volume,
3) structures on the substrate may be damaged or changed,
4) the adhesive layer on the tape may not be uniform over large area, and
5) it may not result in uniform emission properties because of differences in applied pressure during lamination across the surface of the substrate, differences in adhesion and structures already on the substrate that prevent the tape from being applied to certain areas of the CNT paste.

Figure 1:
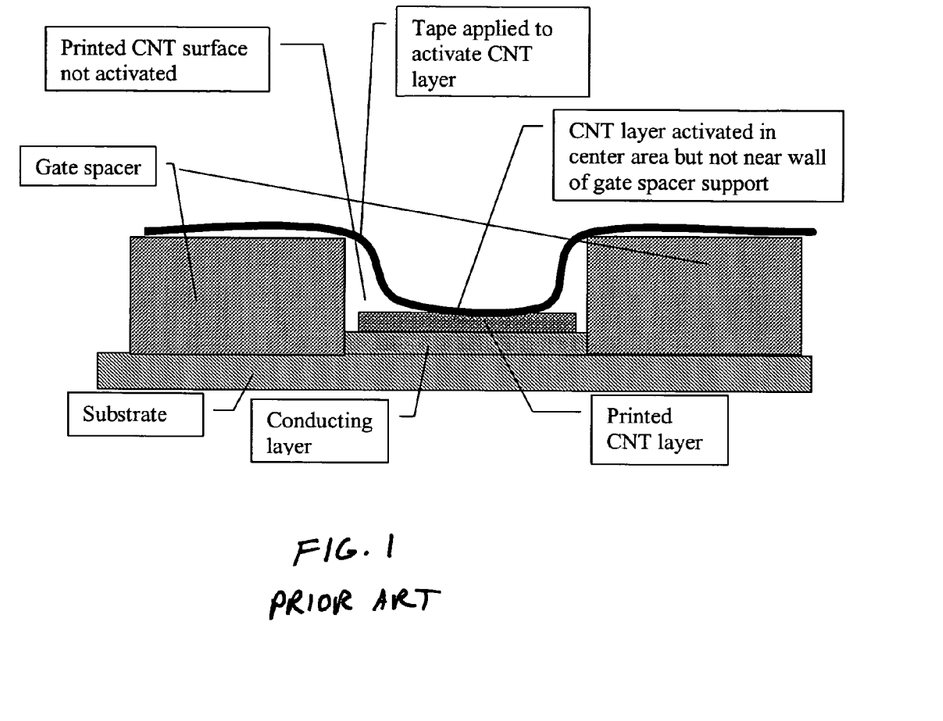
FIG. 1 illustrates tape activation of carbon nanotubes.

An example of the last point is shown in FIG. 1. The CNT film is printed onto a conducting line on an insulating substrate. In this case, only one pixel is shown, but the same is true for substrates having many pixels. Insulating layers are also printed on the substrate to act as spacer layers on which to attach a grid after the activation process is completed. It is difficult to apply the tape near the edges of the grid spacer layers since the tape and lamination rollers are not compliant enough to form around these structures. This results in incomplete activation of the CNT pixel and non-uniform emission properties of the printed CNT layer in the pixel area.

Laser beam activation may also have the same uniformity issues near other structures. It may also damage the CNT because of the high heat from the laser beam. It may also not be scalable to high volume manufacturing of large area displays.

Mechanical or surface scratching also has the same problems. Mechanical brushes would not be able to reach to the bottom of a well as shown in FIG. 1 to activate a CNT layer printed at the bottom of the well. Mechanical brushes may also adversely change the direction of alignment of the CNT fibers.

What is needed in the art is an activation process that can be lower cost, can be scaled to high volume and improves the field emission uniformity in the cathode.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Disclosed is a system and method of activation of printed or dispensed CNT film using a particle-blasting technique, also referred to herein as sandblasting or bead blasting. The process works by sending particles of material at high enough velocity such that when the particles hit the surface, some of the material at the surface is removed. This is similar to the process used to engrave features or text into stone as hard as marble or granite. Similar processes are also developed to be gentle enough to remove dust particles from the surface of microelectronic circuits during fabrication of the circuits without damaging the circuits.

Figure 2:
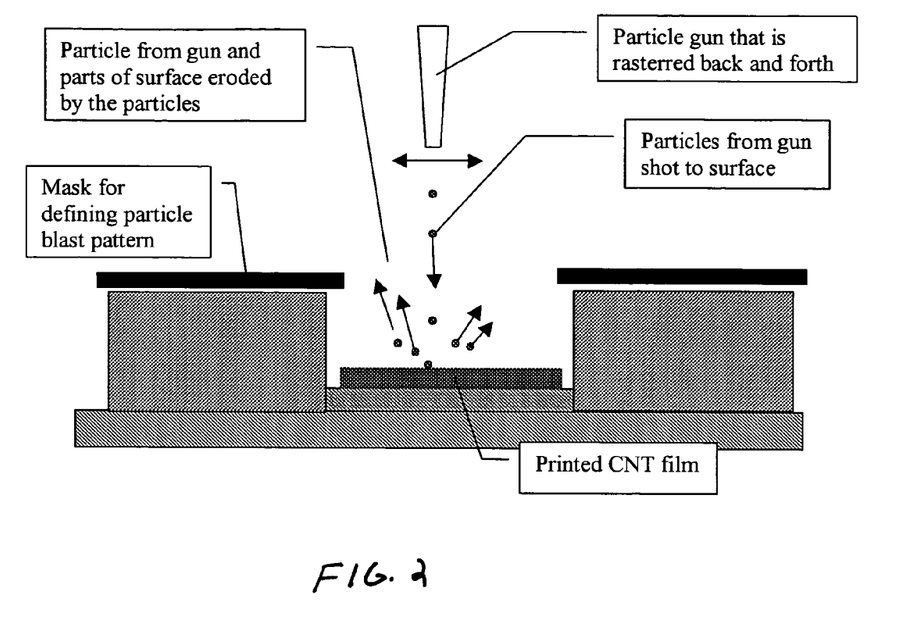
FIG. 2 illustrates an embodiment of the present invention.

Referring to FIG. 2, particles or beads are shot at the surface from a gun using forced air, a centrifugal process or other means. A machine operable for performing this process is the Alps Engineering Micro Blast Machine BSP-20. This is a table-top machine, but Alps Engineering and other companies make much larger machines for large area and high volume applications. Similar machines have been used for barrier rib structures on glass substrates for plasma display panels (see U.S. Pat. No. 5,876,542). The particles can be a solid material like glass, silica $SiO_2$, alumina $Al_2O_3$, silicon Si, or other insulator, semiconductor, metallic particles, or powders. The particles can be spherical, cubical, or other shapes, with smooth or rough surfaces. The particles can also be wires, whiskers or nanotubes. They can be frozen materials such as frozen water $H_2O$ or carbon dioxide $CO_2$ "dry ice", i.e., materials that are normally liquid or gas at standard room temperatures and pressures. Dry ice ($CO_2$) will not leave a residue (it will vaporize to a gas after hitting the surface). Sand particles (mostly $SiO_2$) will also work.

Figure 3:
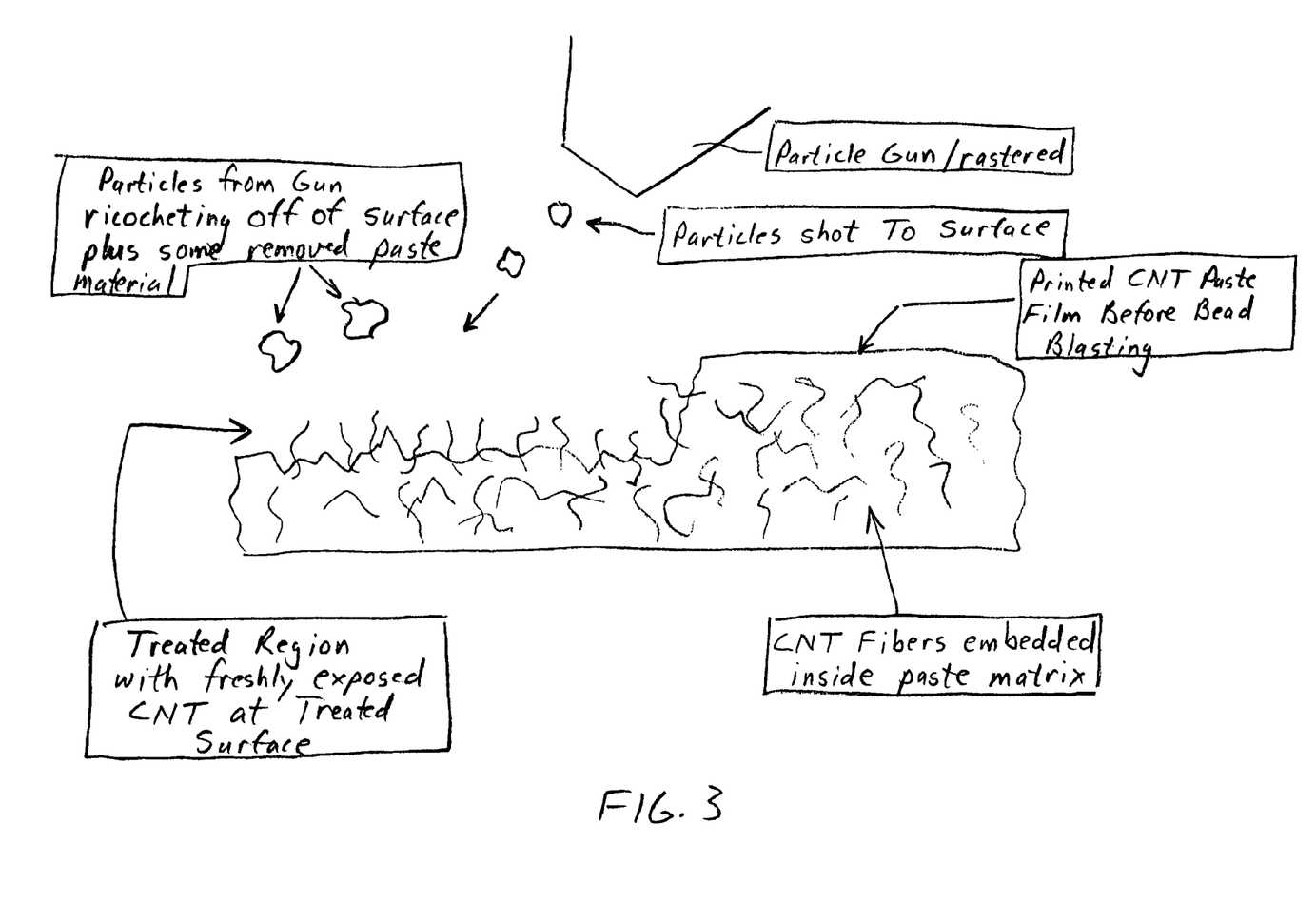
FIG. 3 illustrates exposure of carbon nanotubes by bead blasting.

The surface of the printed CNT film is slowly eroded away by the particles from the particle gun. The CNT fibers may be embedded in several layers of the printed layer, so they may not be removed easily. As illustrated in FIG. 3, this process then will expose a fresh layer of CNT and remove some of the top layer of binder material from the printed CNT layer.

Figure 4:
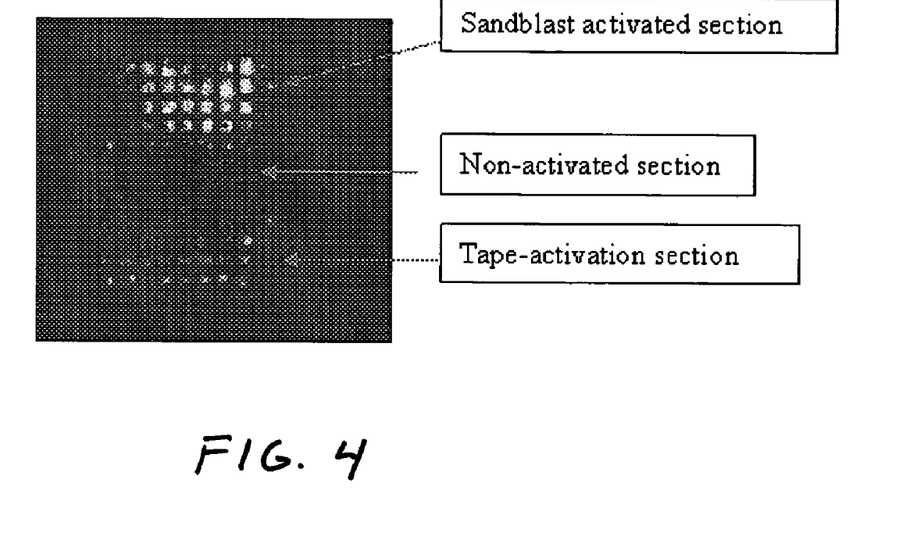
FIG. 4 illustrates a comparison of light emitted from a cold cathode activated by various methods.

To demonstrate advantages of this process, a layer of CNT paste was printed using single-wall carbon nanotubes. Double and multi-wall nanotubes can also be used with similar results. The CNT paste was screen printed onto the substrate in square pixel patterns. One part of the sample was activated by sandblasting as described above to remove only a top layer of the printed material (top part of the next figure). A small lab sandblaster was used. The center part of the sample was not activated at all by any method. The other third of the sample was activated using the tape method (see FIG. 1). The sample was mounted in a vacuum test chamber and all sections of the sample were tested at the same time. The sample was mounted in a diode configuration with a phosphor anode as one electrode and the CNT cathode as the other electrode. The anode was at ground potential. A pulsed bias voltage was placed on the cathode such that electrons from the cathode were extracted and accelerated to the anode to create light as a result of an electric field between the cathode and anode electrodes. FIG. 4 illustrates that the sandblast method activated the printed CNT cathode material to achieve a lower threshold with respect to the tape activated and non-activated areas of the cathode. At the same potential, more current is extracted from the area activated by sandblasting (leading to more light coming from the phosphor in this area) compared to the tape activated and non-activated areas (almost no light at all).

A hard mask such as a metal foil, or a soft mask such as photoresist, may help define the sandblast pattern and keep the particles from eroding other areas of the cathode that need to be left intact. Multiple guns can be used or guns may be large to cover large areas of the cathode. The particles can be as large as several millimeters in diameter or as small as several tens of nanometers. Smaller particles will be gentler and will result in a finer pattern. Larger particles will be more effective in removing material and will results in faster processing. In the above process, particles of order 0.1 mm (100 microns) or smaller diameter were used.

ALTERNATIVE EMBODIMENT No. 1

As noted previously, CNT material is used that is applied to the substrate by screen printing a paste material containing carbon nanotubes. This embodiment shows that the activation process of the present invention is excellent for this type of CNT cathode material.

CNT paste may be prepared by mixing the following ingredients. Single wall CNT material from Iljin Nanotech Co., Korea, may be used in this formulation.

Preparing the CNT Paste

A recipe for making the paste is given below. A wide range of CNT pastes are possible.

| CNT: 5–25% | Vehicle: 50–90% | Glass Frit: 5–25% |
| --- | --- | --- |

Vehicle material acts as the carrier for the powders in the paste and is composed of both volatile (solvents) and non-volatile (polymers) organics. An example of a vehicle is model F1016A02 provided by Pierce & Stevens Corp.

Thinner (Terpineol, Dupont 8250) may be added to adjust the viscosity of the paste. The mixture may be initially ground and mixed with a mortar and pestle and then transferred to a mechanical stirrer to stir the mixture (e.g., 3 hours). The mixture may then be transferred to a three roll mill to further homogenize the paste. There are many variations on making the CNT paste used by those that practice the art. The activation process of the present invention works with all of these CNT paste recipes.

Printing the CNT paste

After the paste is prepared, the paste may be printed onto a substrate (e.g., glass). Two types of glass substrates may be used.
1) In one case, the substrate may be coated with a layer of ITO to provide an electrical conduction path to the printed CNT pattern. A fine mesh (355 mesh) screen of polyester fiber may be used to print the CNT paste onto the substrate. The area of the printed layer may be 3-cm×3-cm. The viscosity of the paste may be adjusted to 50,000–150,000 centipoises (cps).
2) In another case, the glass substrate may be coated with a printed, patterned layer of conducting silver (Ag) paste and a dielectric glass frit layer, typically used in CNT-based field emission displays. The printed Ag and dielectric glass frit layer may be already cured at high temperature by the time the CNT paste later is printed onto the substrate. The CNT paste may be printed using a metal stencil mask to pattern the CNT layer onto the substrate. The viscosity of the paste may be adjusted to 50,000–150,000 cps.

In both cases, a Presco screen printer made by AMI may be used to print the CNT paste onto the substrate. Other screen printers will also work. Typical squeegee printing speeds and pressures may be used and are well know to those skill in the art of screen printing.

After printing the CNT layer, the substrate may be dried and cured using standard processes known to those skilled in the art of screen printing glass frits and Ag patterns. Nitrogen gas may be flowed through the oven during the high temperature curing process. Many variations can be used to dry and cure the CNT paste.

Activation of Printed CNT Cathode

Several samples were prepared as described above. Each was mounted into an Alps Engineering MBP-20 Micro Blast Machine. Glass beads of 30 micron diameter were loaded into the MBP-20 machine. The machine was programmed to raster the bead spray nozzle back and forth with the same pattern for each sample. The parameters that were varied were:

The rate of beads being fed into the gun as noted in revolutions per minute (rpm) of the feed motor delivering bead stock to the gun, and The air pressure used to force the beads to the substrate surface. Several pressures were tried starting at 20 psi (pounds per square inch). It was discovered that this pressure setting removed material quickly. The CNT paste material is very soft after the firing step. Good results were achieved when the gun was operated at low pressures (about 4.2 psi).

Field Emission Results of Activation Process

Table 1 shows the results of several samples printed with the 355 mesh process. Sample p3-a was a control sample (for comparison) that was not activated by sandblasting but by a standard tape activation process (see FIG. 1). The approximate amount of CNT material (as determined by the darkness of the material) that was removed in the process is noted in the last column. The field emission performance results are also noted as the extraction field needed to achieve 30 mA of current from the 3-cm×3-cm square cathode area. Low extraction fields are one figure of merit to judge the quality of the cathode; low extraction fields are desired with all other parameters being equal. By applying the bead blast activation method using a feed rate of 100 and a gun air pressure of 4.2 psi, an extraction field was achieved at 30 mA of current that is significantly lower than the control sample that is processed using a tape activation process.

| Sample | Feed Amount (rpm) | Pressure (psi) | Field at 30 mA (V/um) | Comments |
|---|---|---|---|---|
| P3-a | na | na | 6.1 | control glass, taped |
| P3-b | 200 | 20 | 7.8 | 99% CNT removed |
| P3-c | 200 | 7 | 7.2 | 90% CNT removed |
| P3-e | 100 | 7 | 6.3 | 80% CNT removed |
| P3-d | 100 | 4.2 | 4.8 | 20% CNT removed |

Figure 5:
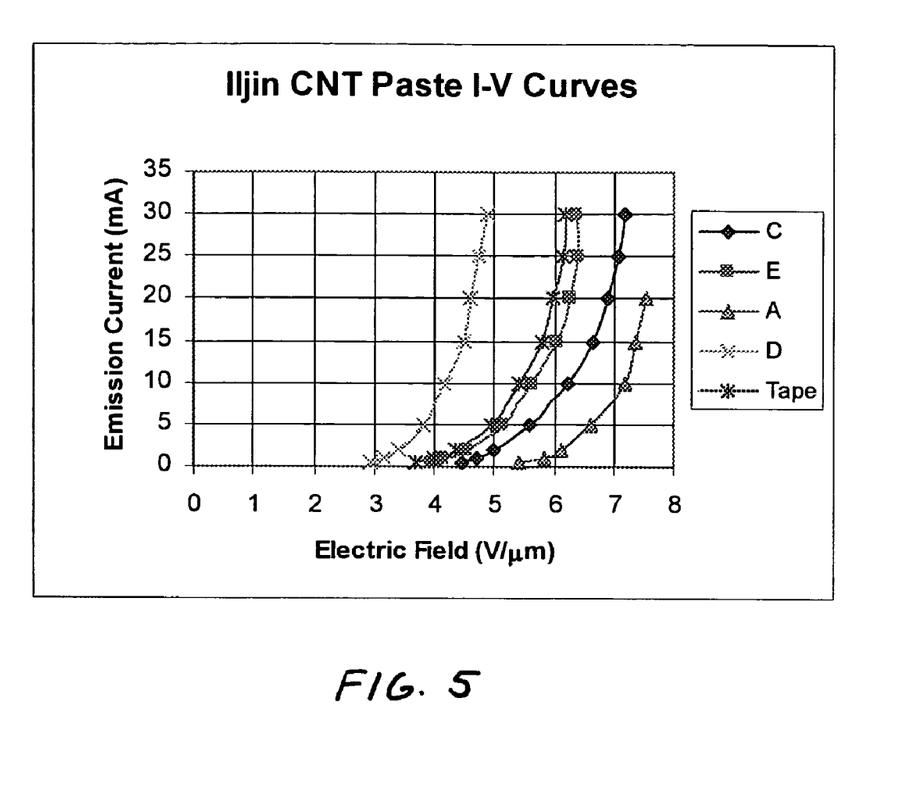
FIG. 5 illustrates an IV graph of cold cathode samples activated by various methods.

The field emission current-voltage (I-V) curves for each of the samples, expressed in current density as a function of extraction field, is shown in FIG. 5. The samples were tested in a diode mode with a 2% duty factor.

Figure 6:
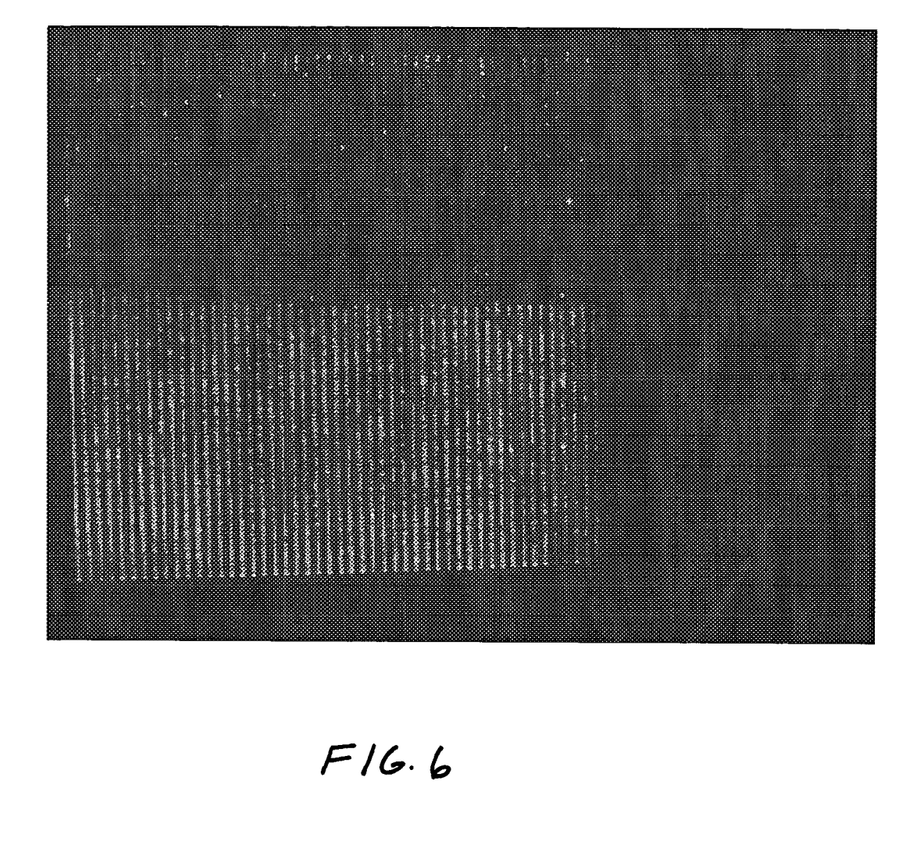
FIG. 6 illustrates a comparison of light emitted from a cold cathode activated by various methods.

Similar results were achieved with the stencil printed samples on the Ag feedlines. FIG. 6 shows light emitted from a sample that was treated by the standard tape activation process on the top half and the bead blast activation process on the bottom half The CNT cathode substrate was assembled with an anode screen in a diode mode and operated at a 2% duty factor. Both halves were subjected to the same field. The brighter half, which was activated by the bead blast process, has a lower threshold field and thus delivers more current at the particular current this image was taken.

Figure 7:
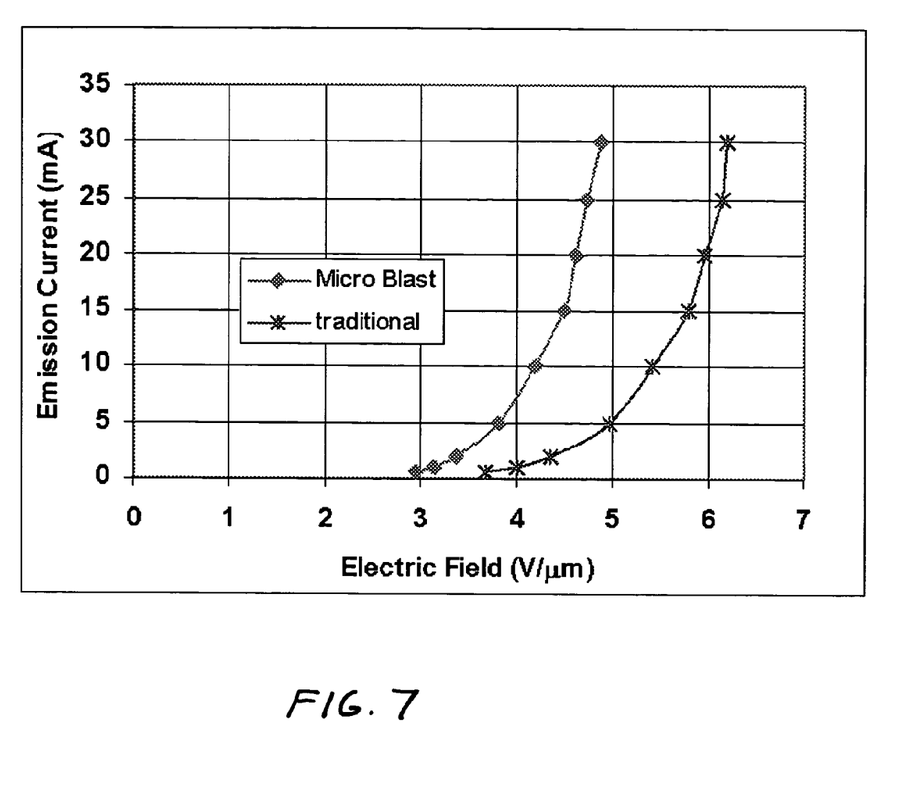
FIG. 7 illustrates an IV graph of a cold cathode activated by various methods.

FIG. 7 shows the I-V curves of a sample activated by the bead blast (Micro Blast) method compared to a similar sample prepared by the tape (traditional) activation process. The results show that the bead blast method also leads to a lower threshold field.

ALTERNATIVE EMBODIMENT No. 2

CNT material is also used that is sprayed or dispensed onto the surface. Often this material has little or no binder (see Chili-Che Kuo et al., "Spray-coated process for preparing CNT-FED cathode," SID 2004 International Symposium Digest of Technical Papers, Vol. 35, Book II, p. 825–827, May 26–27, 2004) to hold the CNT onto the substrate relative to paste samples deposited by screen printing. The activation process of the present invention works well on this type of CNT cathode material as well.

Purified singlewall carbon nanotube (SWNT) powders from Carbon Nanotechnologies Incorporated, Houston, USA may be used. These SWNTs may be approximately 1–2 nm in diameter and 1–15 microns in length. Other single wall or multiwall carbon nanotubes can also be used. This process also works well with CNT material mixed with nanopowders and micropowders of other materials such as glass, $SiO_2$, $Al_2O_3$ or other insulators, semiconductors or metals and alloys.

Preparation of SWNT Solution

1) Grinding of CNTs

The CNT materials may be ground into shorter lengths to improve dispersion of the CNTs in the solvents. This may permit better control of material properties. In some cases, satisfactory results may be achieved without grinding. A simple ball mill may be used to grind SWNT bundles. The rate of this machine may be approximately 50–60 revolutions per minute. 0.05–1.0 gram SWNT bundles as well as 40–100 $Al_2O_3$ balls (5–10 mm in diameter) may be mixed into 200–1000 ml IPA (isopropyl alcohol). The mixture may be ground for 1–7 days in order to disperse the SWNTs. A surfactant (e.g., Triton® X-100, about 1 drop per 100 ml IPA) or similar material can also be added to the mixture in order to achieve better dispersion of SWNTs.

Other solvents can be used instead of IPA (e.g., acetone). Mixtures of solvents can also be used. Water or mixtures of water and organic solvent may also be used. IPA is inexpensive, is not extremely hazardous or toxic, and can be evaporated at relatively low temperatures.

2) Ultrasonic Mixing

Because the SWNTs can easily agglomerate (stick to each other), an ultrasonic mixing process using a horn or bath may be applied to the SWNT solution after removing from the ball mill to disperse the SWNTs again before spraying them onto the substrates. Full power may be applied to the sonicater for 3–5 minutes, until the SWNT solution starts to warm to about 40° C. Other means of applying ultrasonic energy to the solution may also be used.

3) Spraying of CNT Mixture onto the Substrate

The SWNT may be sprayed onto ITO-coated glass plates in 2-cm×2-cm square patterns. A shadow mask may be used to define the pattern of SWNT on the glass. The SWNT solution may be sprayed on various kinds of substrates such as metal, ceramic, glass, plastics, organic and semiconductors. The substrates may be coated with conducting, insulating or semiconducting patterned layers to provide electrical conductivity to some areas and electrical isolation or selected electrical resistance to other areas. These layers may be deposited using printing methods (thick film) or by evaporation, sputtering or other thin film methods. Photolithography patterning and/or etching processes may be needed for additional patterning of these layers. These are standard techniques used in the display and IC industry and are not relevant to this invention.

Figure 8:
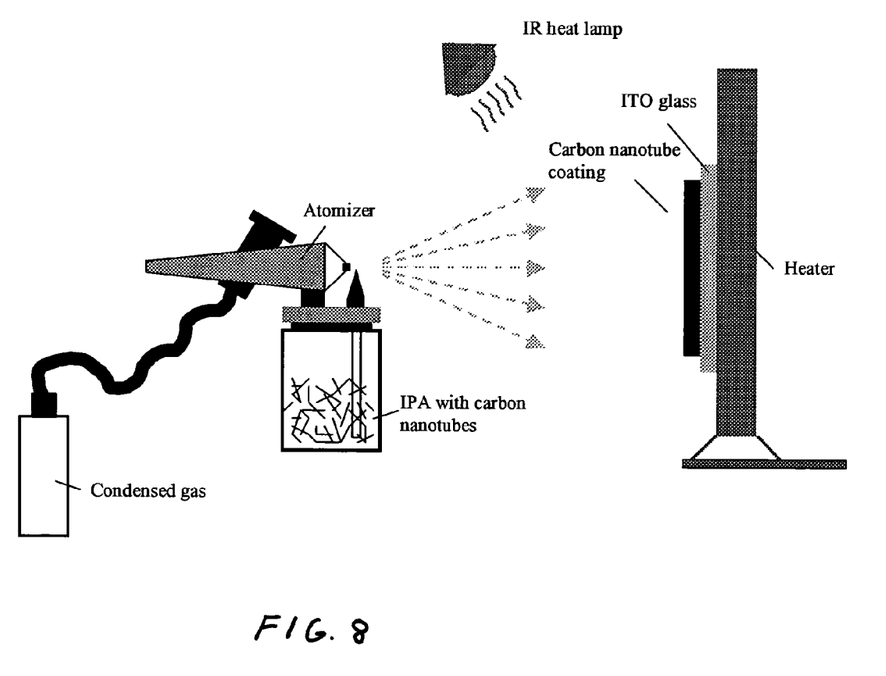
FIG. 8 illustrates a method for applying a CNT mixture to a substrate.

In order to achieve further uniform and well dispersed SWNT coating on the substrates, more IPA may be added into the above solution before spraying. In order to prevent the solution from flowing under the mask to unwanted areas, the substrates may be heated up to 50° C.–100° C. both on front side and back side during the spray process to quickly evaporate the IPA solvent. Magnets behind the glass may be used to hold a metal shadow mask firmly to the glass. The substrates may be sprayed back and forth or up and down several times until the SWNTs cover the entire surface uniformly. The thickness of the SWNTs may be approximately 1–5 microns. A diagram of the spray set-up is shown in FIG. 8. Ink jet printing or other printing techniques may also be used to apply the CNT mixture to the substrate.

Activation of Spray-CNT Cathode

Several samples were prepared as described above. Each was mounted into an Alps Engineering MBP-20 Micro Blast Machine. Glass beads of 30 micron diameter were loaded into the MBP-20 machine. The machine was programmed to raster the bead spray nozzle back and forth with the same pattern for each sample. The parameters that were used were:

The rate of beads being fed into the gun as noted in revolutions per minute (rpm) of the feed motor delivering bead stock to the gun, and The air pressure used to force the beads to the substrate surface. Several pressures were tried starting at 20 psi (pounds per square inch). It was discovered that this pressure setting removed material quickly, since the CNT was weakly bound to the substrate surface (no binder was used). Good results were achieved when the gun was operated at low pressures (less than 3 psi).

Table 2 shows the results of several samples. Sample c-1 was a control sample that was not activated by bead blasting but by a standard tape activation process (see FIG. 1). It was used as a control for comparison. The approximate amount of CNT material that was removed in the process is noted in the last column. The field emission performance results are also noted as the extraction field needed to achieve 30 mA of current from the 2-cm×2-cm square cathode area. Low extraction fields are one figure of merit to judge the quality of the cathode; low extraction fields are desired with all other parameters being equal.

| Substrate | Feed Amount (rpm) | Air Pressure (psi) | Field at 30 mA (V/um) | Comments |
|---|---|---|---|---|
| c-1 | na | Na | 2.9 | control sample, tape activated |
| c-2 | 100 | 1.4 | 3.2 | 80% CNT removed |
| c-3 | 100 | 2.8 | 3.6 | 99% CNT removed |
| c-4 | 10 | 2.8 | 2.7 | 20% CNT removed |
| c-5 | 30 | 2.8 | 2.9 | 60% CNT removed |
| c-6 | 20 | 2.8 | 2.8 | 40% CNT removed |
| c-7 | 10 | 2.8 | 3.0 | 20% CNT removed |
| c-8 | 5 | 2.8 | 3.2 | 10% CNT removed |

Figure 9:
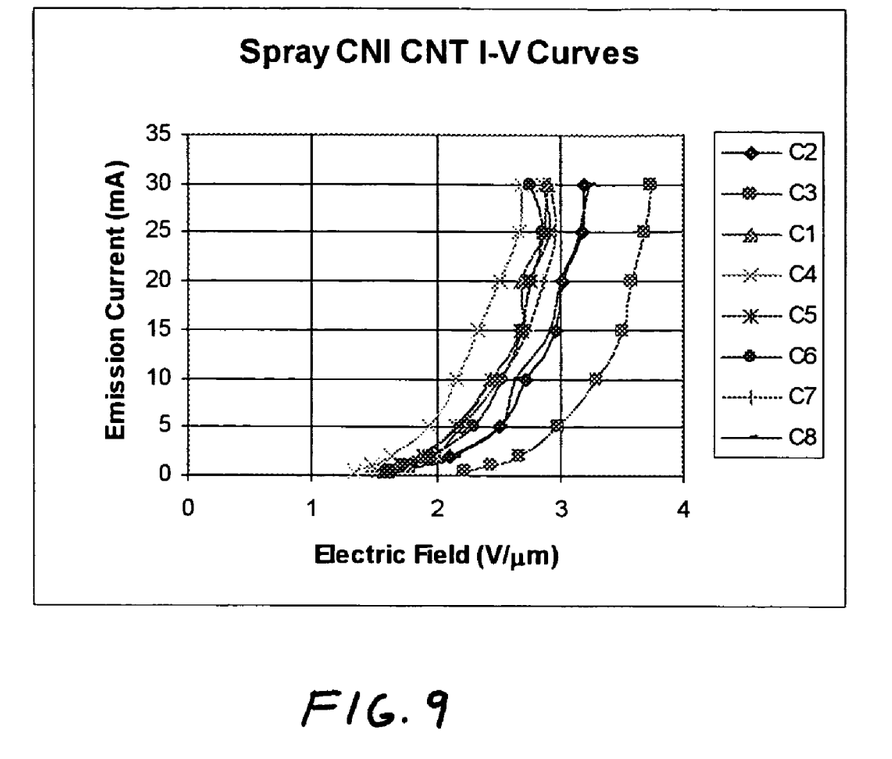
FIG. 9 illustrates IV curves.

The field emission current-voltage (I-V) curves, expressed in current density as a function of extraction field, is shown in FIG. 9. The curve with the lowest extraction field at is c-4, although other curves show similar results. At least 3 samples activated by the bead blasting technique disclosed here have results that are as good as or better than the benchmark taped sample. The samples were tested in a diode mode with a 2% duty factor.

Variations

The bead blast activation process will work with CNT cathodes made from single, double or multiwall carbon nanotubes. It is also possible to pattern a CNT cathode in the same process used to activate the cathode using a bead blasting process. For example, one can pattern lines of conducting feedlines that contain CNT fibers using standard screen printing techniques. Using a mask and a bead blaster, one can activate specific regions of cathode as defined by the open areas of the mask.

Figure 10A:
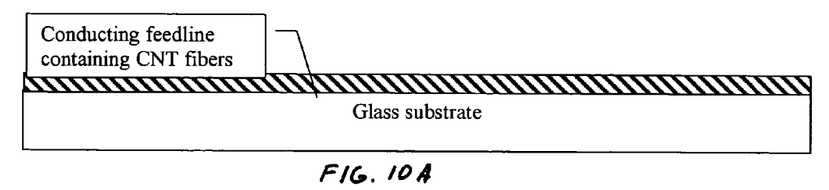
FIGS. 10A–10C illustrate a process for rastering a bead blaster through a mask to activate a cold cathode.

Step 1. Print conducting feedlines containing CNT fibers on a insulating substrate such as glass. See FIG. 10A.

Figure 10B:
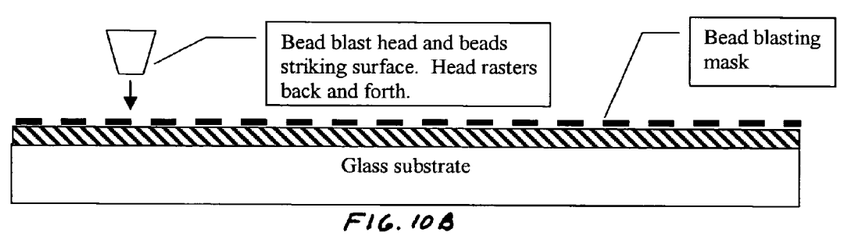

Step 2. Put mask over the conducting feedlines and bead blast through the mask. See FIG. 10B.

Figure 10C:
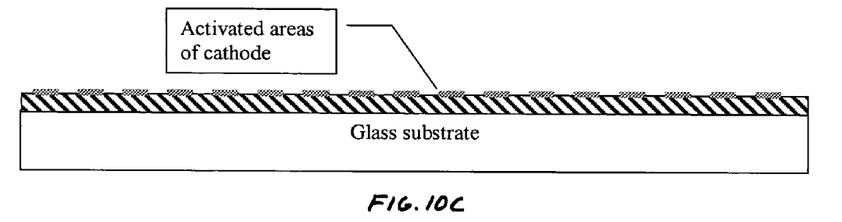
Figure 11:
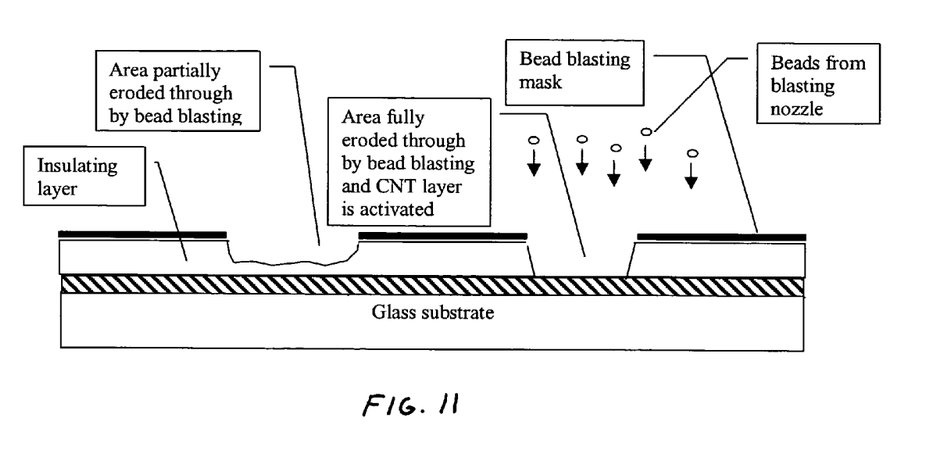
FIG. 11 illustrates bead blasting through an insulating layer.

Step 3. Remove mask, only the areas where the feedline was exposed the blasting beads (areas corresponding to holes in the mask) will be activated for good field emission. See FIG. 10C. This process works equally as well if the feedline also was coated with an insulating layer such as glass frit. See FIG. 11. The bead blasting would drill through the insulating layer. When the bottom of the hole reached the feedline layer containing the CNT fibers, the blasting activity would activate this layer inside the hole that was created.

It is important to also note that the angle of attack of the beads or particles can be perpendicular to the surface (typical), but it can also be at other angles off of perpendicular, ranging from 0–90 degrees.

What is claimed is:

1. A method for enhancing field emission properties of a cold cathode by bead blasting a surface of the cold cathode material, wherein the cold cathode material includes carbon nanotubes.

2. The method as recited in claim 1, wherein the cold cathode material comprises a paste containing the carbon nanotubes.

3. The method as recited in claim 1, wherein the cold cathode material comprises a thin film containing the carbon nanotubes.

* * * * *